United States Patent [19]

Jantzen

[11] Patent Number: 5,102,439
[45] Date of Patent: Apr. 7, 1992

[54] METHOD FOR MELTING GLASS BY MEASUREMENT OF NON-BRIDGING OXYGEN

[76] Inventor: Carol M. Jantzen, 3922 Wood Valley Dr., Aiken, S.C. 29801

[21] Appl. No.: 690,046

[22] Filed: Apr. 23, 1991

[51] Int. Cl.$^5$ ............................................... C03B 5/24
[52] U.S. Cl. ........................................... 65/29; 65/27; 65/134; 65/335
[58] Field of Search ...................... 65/27, 29, 134–135, 65/136, 335, 30.13

[56] References Cited

U.S. PATENT DOCUMENTS

| | | | |
|---|---|---|---|
| 3,476,538 | 11/1969 | Trethewey | 65/29 |
| 4,325,724 | 4/1982 | Froberg | 65/135 X |
| 4,812,151 | 3/1989 | Sheinkop et al. | 65/29 |
| 5,007,948 | 4/1991 | Araujo | 65/30.13 |

Primary Examiner—Robert L. Lindsay
Attorney, Agent, or Firm—Harold M. Dixon; William R. Moser; Richard E. Constant

[57] ABSTRACT

A method for making better quality molten glass in a glass melter, the glass having the desired viscosity and, preferably, also the desired resistivity so that the glass melt can be established effectively and the product of the glass melter will have the desired level of quality. The method includes the adjustment of the composition of the glass constituents that are fed into the melter in accordance with certain correlations that reliably predict the viscosity and resistivity from the melter temperature and the melt composition, then heating the ingredients to the melter's operating temperature until they melt and homogenize. The equations include the calculation of a "non-bridging oxygen" term from the numbers of moles of the various ingredients, and then the determination of the viscosity and resistivity from the operating temperature of the melter and the non-bridging oxygen term.

16 Claims, 3 Drawing Sheets 5,102,439

METHOD FOR MELTING GLASS BY MEASUREMENT OF NON-BRIDGING OXYGEN

The United States Government has rights in this invention pursuant to Contract No. DE-AC0989SR18035 between the U.S. Department of Energy and Westinghouse Savannah River Company.

BACKGROUND OF THE INVENTION

1. Field of the Invention

The present invention relates to glass making. In particular, the present invention relates to making molten glass having the viscosity and resistivity needed to achieve a desired level of quality of the glass product and to improve processibility of the melt.

2. Discussion of Background

Glass has been made for thousands of years. It has been used in a wide variety of applications, from windows to art objects, from kitchen utensils to scientific apparatus.

Because of its chemical stability, it is useful as a matrix in which to encapsulate hazardous and radioactive wastes. Borosilicate glass in particular is believed to be an ideal medium for the stable and permanent immobilization of radioactive waste for disposal in geologic repositories.

Typically, glass forming frit and or chemical compounds are fed into an electric melter where electrodes cause the frit to melt by joule heating. As the frit melts and its various ingredients combine, the molten glass can be poured off into molds or canisters. Additional frit is added and melted continuously or periodically. If other materials are to be included in the glass matrix, they are added to the frit simultaneously at predetermined weight ratios.

The two most important properties of the glass melt are the viscosity and resistivity of the combination of constituents. These properties have a fundamental effect on the processibility and quality of the glass product produced from the molten glass.

Viscosity of the melt as a function of temperature is the single most important variable affecting the melt rate of the raw feed, the rate of gas bubble release due to foaming and fining, the rate of homogenization, and the pourability of the glass. If the viscosity is too low, excessive convection currents can occur, increasing corrosion and erosion of the melter materials (refractories and electrodes) and making control of the melter more difficult. For a melter having an operating temperature of about 1150° C., a desirable viscosity range is 20–100 poise. For melters which can reach 1300°–1400° C., viscosities greater than 100 poise are acceptable. Viscosity should range from about 20 poise to not more than about 500 poise, since glasses having viscosities above 500 poise do not pour.

Viscosity is known to be a function of temperature. It is a difficult physical property to measure; and it is impossible to measure viscosity routinely during the production of glass. For example, in the glass industry, the measurement of viscosity is usually performed on a small batch of glass made in a laboratory prior to feeding the glass to a large commercial melter. For glass that incorporates hazardous and radioactive wastes, even premeasurement is impossible.

In electrical melters, the electrical resistivity as a function of temperature is the single most important variable affecting the establishing of the melt itself.

Controlling the process of glass making, including the viscosity and the resistivity of the molten glass, determines the quality of the product. For applications such as encapsulation of radioactive waste, a high quality product is essential. For many other industrial applications, a high quality product is no less desirable.

SUMMARY OF THE INVENTION

According to its major aspects and broadly stated, the present invention is a method for making molten borosilicate glass having the desired viscosity and, preferably, also the desired resistivity so that the glass melt can be established effectively and the glass product will have the desired level of quality. The method includes the adjustment of the composition of the glass constituents that are fed into a melter in accordance with certain equations that predict the viscosity and resistivity, then heating electrically the ingredients to the melter's operating temperature. The equations enable the calculation of a "non-bridging oxygen" term from the numbers of moles of the various ingredients and the calculation of the viscosity and resistivity from the operating temperature of the melter and the non-bridging oxygen term.

An important feature of the invention is the accurate prediction of the viscosity from the ingredients and melter temperature. The relative amounts of the ingredients can be controlled as can the temperature. Thus, the viscosity that will produce the level of quality desired in the glass product can be obtained without experimentation. This feature is especially important in the encapsulation of wastes where one or more of the ingredients, such as the waste itself, may vary from time to time but the quality must remain high.

Another feature of the invention is the accurate prediction of the resistivity of the ingredients. The melt is joule heated; its resistivity in combination with the electrical current imposed on it will determine the heat rate and the amount of energy required to achieve operating temperatures. Knowing the resistivity allows the heating to be controlled and the problems of overheating and underheating to be avoided.

Another feature of the invention is the relationship of resistivity to viscosity. The ability to predict resistivity in a glass from its composition, or alternatively from its viscosity, if known, is important to startup and/or restart of Joule-heated electric melters.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
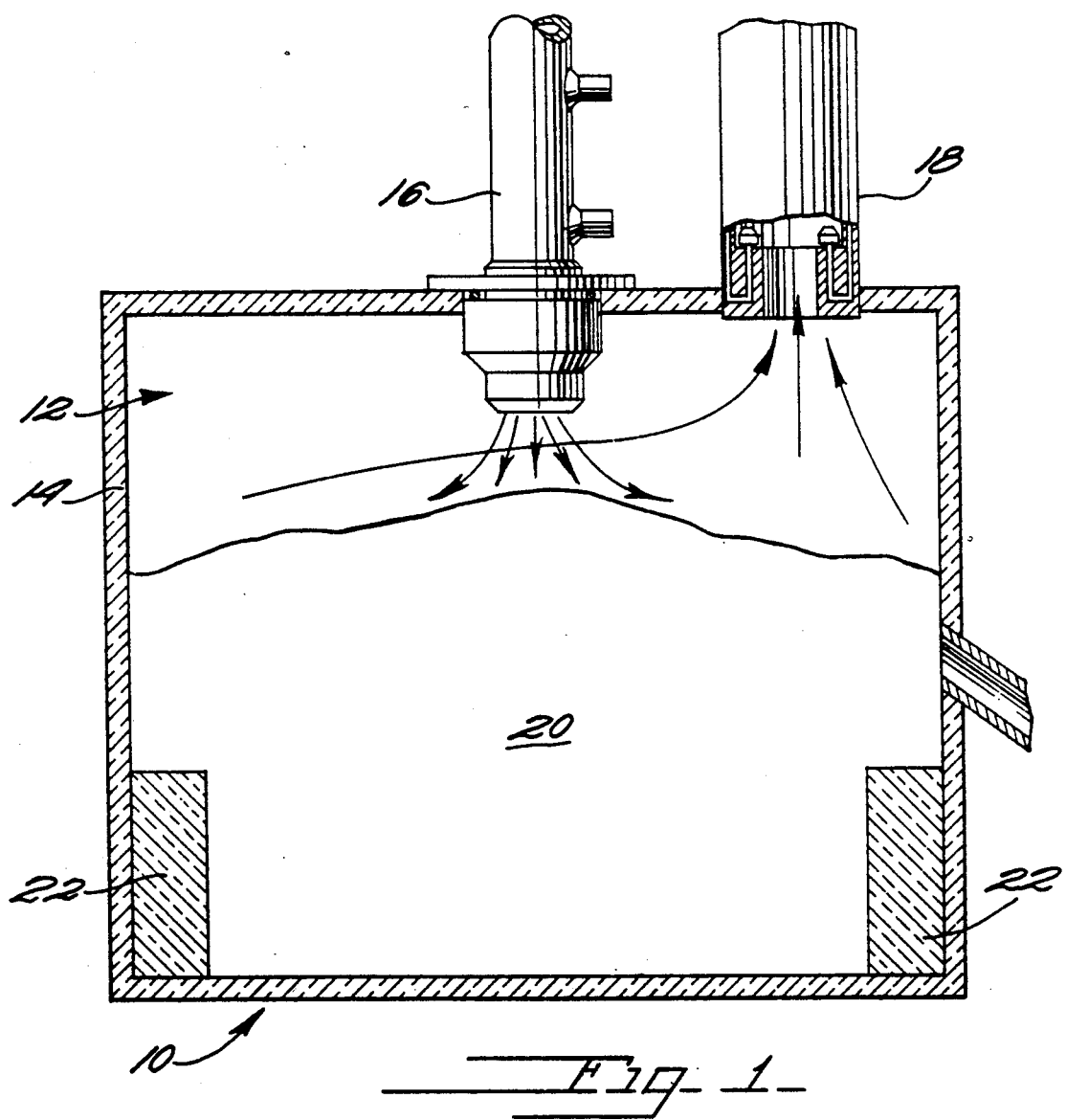
FIG. 1 is a side cross-sectional view of a glass melter according to a preferred embodiment of the present invention.

Referring now to FIG. 1, there is illustrated a glass melter 10 according to a preferred embodiment of the present invention. Melter 10 has a chamber 12 defined within a wall 14. A feed tube 16 for feeding ingredients into chamber 12 is attached to wall 14 near the top of melter 10. An off gas stack 18 removes heat and gases from chamber 12.

In chamber 12 is a melt 20 which is a mostly-molten mass of ingredients. Electrodes 22 create heat in the ingredients by applying an electric current to melt 20 which has a resistivity that enables melt 20 to generate heat by joule heating.

Figure 2:
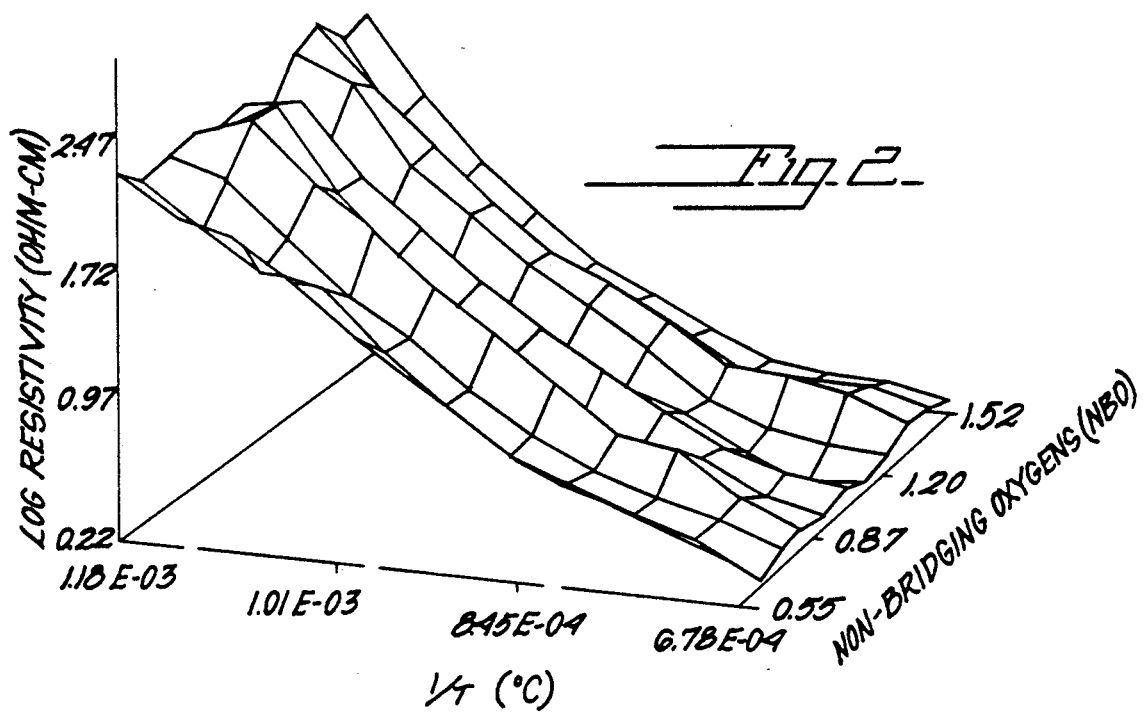
FIG. 2 is a graphical representation of resistivity as a function of temperature and the non-bridging oxygen term according to the present invention.

Referring to FIG. 2, glass forms when silicon is coordinated by four oxygen atoms in a tetrahedral arrangement. These $(SiO_4)^{-4}$ tetrahedra link continuously and in an ordered fashion in crystalline $SiO_2$. In vitreous $SiO_2$, however, the linkages are fully polymerized but the $(SiO_4)^{-4}$ linkages are randomly distributed. The presence of alkali or alkaline earths tends to depolymerize the $(SiO_4)^{-4}$ linkages. The monovalent cations such as sodium, lithium, cesium, or potassium, will cause non-bridging oxygen bonds to form. In fact, every mole of such monovalent oxide ($M_2O$) will cause two such non-bridging oxygen bonds to form. $Al_2O_3$ forms $(AlO_4)^{-5}$ tetrahedral linkages and forms 2 bridging oxygen bonds. $Fe_2O_3$ can form $(FeO_4)^{-5}$ tetrahedral linkages and form bridging or nonbridging bonds depending on the amount of alkali present. At low concentrations, $B_2O_3$ generates one bridging oxygen atom per mole because $B_2O_3$ enters the glass network as $(BO_4)^-$ tetrahedra. At higher concentrations these tetrahedra are converted to planar $(BO_3)^-$ groups containing one non-bridging oxygen atom.

A non-bridging oxygen (NBO) term is given by the expression:

$$NBO = \{2^*[N_1(M_2O) + N_2(Fe_2O_3) - N_3(Al_2O_3)] + N_4(B_2O_3)\}/N_5(SiO_2) \quad \text{(Equation 1)}$$

where $N_1(M_2O)$ is the number of moles of $M_2O$ which includes $K_2O$, $Cs_2O$, $Li_2O$ and $Na_2O$ and other monovalent cations; $N_2(Fe_2O_3)$ is the number of moles of $Fe_2O_3$; $N_3(Al_2O_3)$ is the number of moles of $Al_2O_3$, $N_4(B_2O_3)$ is the number of moles of $B_2O_3$; and $N_5(SiO_2)$ is the number of moles of $SiO_2$.

Equation 1 assumes that every mole of $M_2O$, and $Fe_2O_3$ depolymerizes 2 oxygen bonds, and every mole of $B_2O_3$ depolymerizes 1 bond, and every mole of $Al_2O_3$ polymerizes 2 bonds.

The NBO term is then used to calulate the resistivity ($\rho$) and viscosity ($\eta$), respectively, using the following equations:

$$\log \rho(\text{ohm-cm}) = -1.09 + 2465.35/T(°C.) - 0.45 \text{ NBO} \quad \text{(Equation 2)}$$

The regression coefficient ($R^2$) of Equation 2 is 0.92.

$$\log \eta(\text{poise}) = -0.61 + 4472.45/T(°C.) - 1.534 \text{ NBO} \quad \text{(Equation 3)}$$

The regression coefficent ($R^2$) of Equation 3 is 0.98.

These equations were obtained by correlating data from numerous measurements of viscosity under controlled conditions and are accurate in the temperature range 700° C. to 1250° C. with an $R^2$ of 0.92 and 0.98, respectively. The equations also hold for (1) glass compositions having high percentages of alumina and/or high iron content; (2) for glasses with high alkali and high silica content; and (3) for pure borosilicate glass frit. When rounded to two significant figures, the coefficients in the two equations provide sufficient accuracy for many applications.

Figure 3:
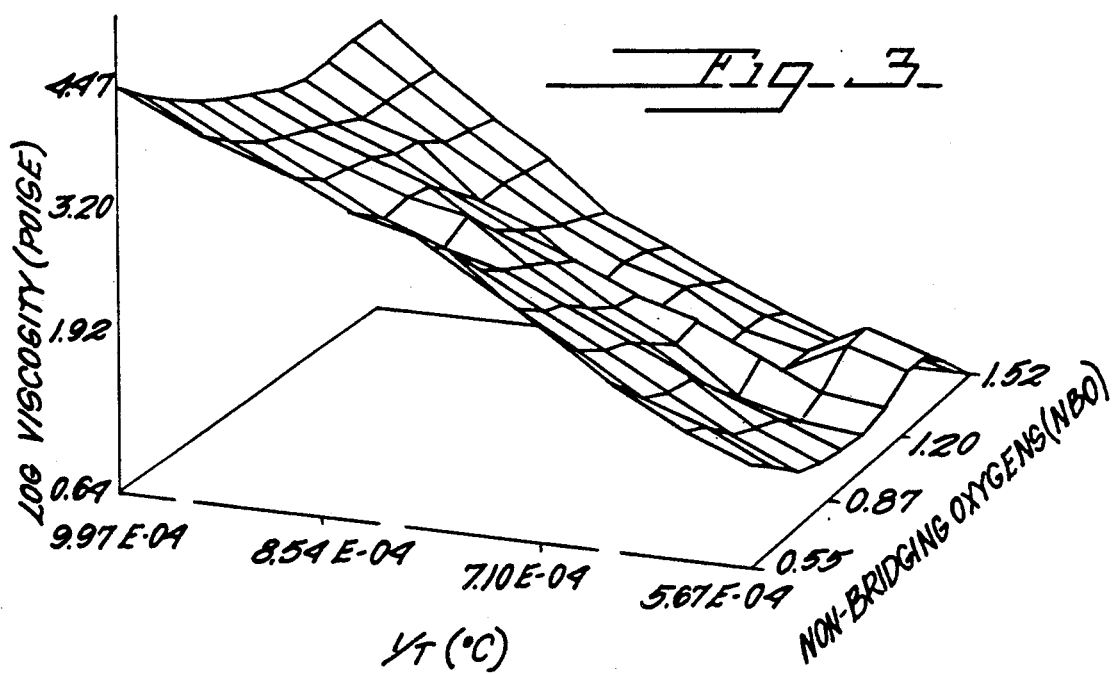
FIG. 3 is a graphical representation of viscosity as a function of temperature and the non-bridging oxygen term according to the present invention.

Equations 2 and 3 are graphically depicted in FIGS. 2 and 3, respectively.

Figure 4:
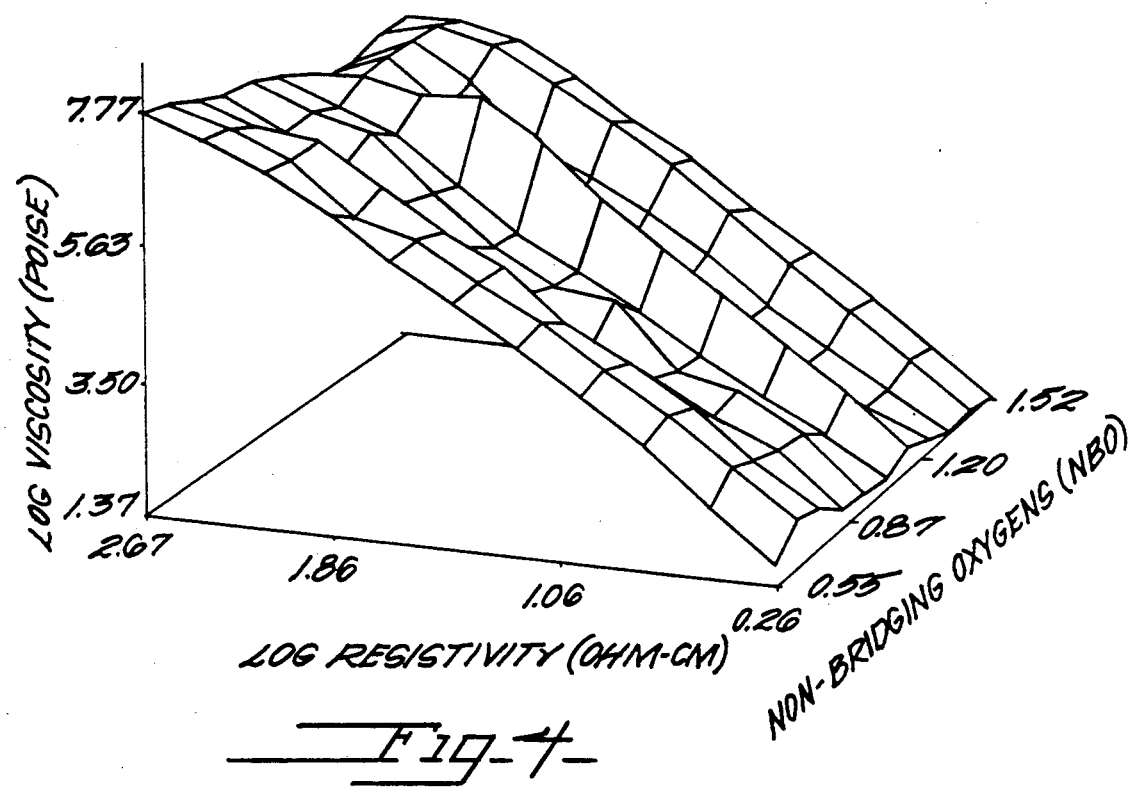
FIG. 4 is a graphical representation of viscosity as a function of resistivity and the non-bridging oxygen term according to the present invention.

Electrical resistivity can be correlated to viscosity, as shown in FIG. 4. The ability to predict resistivity in a glass from its composition, or alternatively from its viscosity, is important to startup and/or restart of Joule-heated electric melters. At low temperatures, glasses are good insulators, while at high temperatures, they conduct electric current relatively well so that the glass melt may be heated by direct passage of electric current. The electrical resistivity is, therefore, the single most important variable affecting the establishment of Joule heating in an electric melter.

The relationship between log viscosity ($\eta$) and log resistivity ($\rho$) and NBO for all temperatures forms a response surface (FIG. 4) with the equation $$\log \eta(\text{poise}) = 0.84 - 0.67 \text{ NBO} + 2.42 \log \rho(\text{ohm-cm}) \quad \text{(Equation 4)}$$

The regression coefficient of Equation 4 is 0.95.

In use, molten glass having a viscosity in a desired viscosity range can be made in a glass melter that operates at some typical operating temperature by first selecting a set of proposed constituents for said glass. Using Equation 1, the NBO term is calculated from this set of constituents. The NBO term is inserted along with the operating temperature of the melter into Equations 2 and 3 to determine the resistivity and the viscosity of the molten glass based on that set of constituents. If the viscosity lies outside the desirable range, the constituents are adjusted and a new NBO term calculated and inserted into Equation 3. When a set of constituents is finally selected that results in an acceptable viscosity, the resistivity is recalculated based on the final set. The melter is charged with the glass composition constituents in amounts established by this final set and the melter heated. In an electrically heated melter, the resistivity and the current applied through the electrodes determines the heat rate and temperature of the melt.

As an example of use, glass was made having the following constituents in the molar amounts listed: $Al_2O_3$ (2.90), CaO (1.06), $Fe_2O_3$ (4.76), MgO (1.20), MnO or $MnO_2$ (2.42), $Na_2O$ (10.83), $Li_2O$ (11.04), $SiO_2$ (57.75), $B_2O_3$ (6.77), $ZrO_2$ (0.38), $K_2O$ (0.02) for a total of 99.99. The value of the coefficients of the NBO term are then: $N_1 = 21.89$, $N_2 = 4.76$, $N_3 = 2.90$, $N_4 = 6.77$ and $N_5 = 57.75$. The calculated value of NBO is 0.9397. At a melter operating temperature of 1160° C., the log $\eta$ is 1.80 and thus the calculated viscosity is 63.6 poise. The measured viscosity was 61 poise. The log of $\rho$ is 0.612 and thus the calculated resistivity is 4.14 ohm-cm. The measured resistivity was 5.08 ohm-cm.

It will be apparent to those skilled in the art that many changes and substitutions can be made to the preferred embodiment herein described without departing from the spirit and scope of the present invention as defined by the appended claims.

What is claimed is:

1. A method for making molten glass having a viscosity in a desired viscosity range, said glass made in a melter operating at a temperature in an operating temperature range and operating at a power level within a power level range, comprising the steps of:

selecting a set of proposed constituents for said glass;

determining the amount of non-bridging oxygen that is in said set of proposed constituents based on the number of moles of each proposed constituent in said set of proposed constituents;

selecting an operating temperature for said melter within said operating temperature range;

determining a calculated viscosity for said set of proposed constituents using a first correlation of viscosity as a function of temperature and non-bridging oxygen and said operating temperature and said amount of non-bridging oxygen;

comparing said calculated viscosity to determine if said calculated viscosity is in said desired viscosity range;

adjusting said proposed set of constituents to obtain a second proposed set of constituents that yields a different amount of non-bridging oxygen, if said calculated viscosity is not in said desired viscosity range, until said calculated viscosity is in said desired viscosity range;

charging said melter with said second set of constituents; and heating said second set of constituent to said operating temperature, whereby said second set of constituents is melted.

2. The method as recited in claim 1, wherein said melter is heated with electrodes and said method further comprises the steps of:

determining by using a second correlation of resistivity as a function of temperature and non-bridging oxygen and said amount of non-bridging oxygen corresponding to said second set of proposed constituents and said operating temperature of said melter, a resistivity of said second set of proposed constituents; and determining an amount of current required to heat said second set of constituents to said operating temperature from said resistivity.

3. The method as recited in claim 1, wherein said melter is heated with electrodes and said method further comprises the steps of:

determining by using a second correlation of resistivity as a function of viscosity and non-bridging oxygen and said amount of non-bridging oxygen corresponding to said second set of proposed constituents and said calculated viscosity, a resistivity of said second set of proposed constituents; and determining an amount of current required to heat said second set of constituents to said operating temperature from said resistivity.

4. The method as recited in claim 1, wherein said amount of non-bridging oxygen is given by the equation:

$$\text{Non-bridging oxygen} = \{2^*[N_1(M_2O) + N_2(Fe_2O_3) - N_3(Al_2O_3)] + N_4(B_2O_3)\}/N_5(SiO_2).$$

5. The method as recited in claim 4, wherein said first correlation is:

$$\log \text{viscosity (poise)} = -0.6 + 4500/T(^\circ C.) - 1.5 \text{ Non/bridging oxygen.}$$

6. The method as recited in claim 4, wherein said first correlation is:

$$\log \text{viscosity (poise)} = -0.61 + 4472.45/T(^\circ C.) - 1.534 \text{ non-bridging oxygen.}$$

7. The method as recited in claim 2, wherein said amount of non-bridging oxygen is given by the equation:

$$\text{Non-bridging oxygen} = \{2^*[N_1(M_2O) + N_2(Fe_2O_3) - N_3(Al_2O_3)] + N_4(B_2O_3)\}/N_5(SiO_2)$$

and wherein said second correlation is $$\log \text{resistivity (Ohm-cm)} = -1.1 + 2450/T(^\circ C.) - 0.45 \text{ non-bridging oxygen.}$$

8. The method as recited in claim 3, wherein said amount of non-bridging oxygen is given by:

$$\text{Non-bridging oxygen} = \{2^*[N_1(M_2O) + N_2(Fe_2O_3) - N_3(Al_2O_3)] + N_4(B_2O_3)\}/N_5(SiO_2)$$

and wherein said second correlation is:

$$\log \text{viscosity (poise)} = 0.8 - 0.7 \text{ non-bridging oxygen} + 2.4 \log \text{resistivity (ohm-cm)}.$$

9. The method as recited in claim 2, wherein said amount of non-bridging oxygen is given by:

$$\text{Non-bridging oxygen} = \{2^*[N_1(M_2O) + N_2(Fe_2O_3) - N_3(Al_2O_3)] + N_4(B_2O_3)\}/N_5(SiO_2)$$

and wherein said second correlation is:

$$\log \text{resistivity (ohm-cm)} = -1.09 + 2465.35/T(^\circ C.) - 0.45 \text{ non-bridging oxygen.}$$

10. The method as recited in claim 3, wherein said amount of non-bridging oxygen is given by:

$$\text{Non-bridging oxygen} = \{2^*[N_1(M_2O) + N_2(Fe_2O_3) - N_3(Al_2O_3)] + N_4(B_2O_3)\}/N_5(SiO_2)$$

and wherein said second correlation is:

$$\log \text{viscosity (poise)} = 0.83 - 0.67 \text{ non-bridging oxygen} + 2.42 \log \text{resistivity (ohm-cm)}.$$

11. The method as recited in claim 1, wherein said desired viscosity range is approximately 20–100 poise.

12. A method for making molten glass having a viscosity in a desired viscosity range, said glass made in a melter operating at a temperature in an operating temperature range and operating at a power level within a power level range, comprising the steps of:

selecting a set of proposed constituents for said glass;

determining a non-bridging oxygen by the equation:

$$\text{Non-bridging oxygen} = \{2^*[N_1(M_2O) + N_2(Fe_2O_3) - N_3(Al_2O_3)] + N_4(B_2O_3)\}/N_5(SiO_2)$$

for said set of proposed constituents;

selecting an operating temperature for said melter within said operating temperature range;

determining using the correlation:

$$\text{log viscosity (poise)} = -0.6 + 4500/T(°C) - 1.5 \text{ non-bridging oxygen}$$

and said operating temperature and said amount of non-bridging oxygen, a calculated viscosity for said set of proposed constituents;

comparing said calculated viscosity to determine if said calculated viscosity is in said desired viscosity range;

adjusting said proposed set of constituents to obtain a second proposed set of constituents that yields a different non-bridging oxygen term, if said calculated viscosity is not in said desired viscosity range, until said calculated viscosity is in said desired viscosity range;

charging said melter with said second set of constituents; and heating said second set of constituent to said operating temperature, whereby said second set of constituents is melted.

13. The method as recited in claim 12, wherein said melter is heated with electrodes and said method further comprises the steps of:

determining by using a second correlation of resistivity as a function of temperature and non-bridging oxygen and said non-bridging oxygen term corresponding to said second set of proposed constituents and said operating temperature of said melter, a resistivity of said second set of proposed constituents; and determining an amount of current required to heat said second set of constituents to said operating temperature from said resistivity.

14. The method as recited in claim 13, wherein said second correlation is:

$$\text{log resistivity (ohm-cm)} = -1.1 + 2450/T(°C) - 0.45 \text{ non-bridging oxygen.}$$

15. The method as recited in claim 13, wherein said second correlation is:

$$\text{log resistivity (ohm-cm)} = -1.09 + 2465.35/T(°C) - 0.45 \text{ non-bridging oxygen.}$$

16. The method as recited in claim 12, wherein said viscosity range is approximately 20–500 poise.

* * * * *